J. G. EVENDEN.

CANS FOR OIL, &c.

No. 7,531. Reissued Feb. 27, 1877.

Attest
W. C. Corlies
E. S. Lloyd.

Inventor,
John G. Evenden.
Per. Edmund Wright
Atty.

N. PETERS, PHOTO-LITHOGRAPHER, WASHINGTON, D. C.

UNITED STATES PATENT OFFICE.

JOHN G. EVENDEN, OF CHICAGO, ILLINOIS, ASSIGNOR OF TWO-THIRDS INTEREST TO F. CORTEZ WILSON.

IMPROVEMENT IN CANS FOR OIL, &c.

Specification forming part of Letters Patent No. 153,816, dated August 4, 1874; reissue No. 7,531, dated February 27, 1877; application filed December 28, 1876.

*To all whom it may concern:*

Be it known that I, JOHN G. EVENDEN, of Chicago, in the county of Cook and State of Illinois, have invented a new and useful Improvement in Wood-Incased Cans; and I do hereby declare the following to be a full, clear, and exact description of the same, reference being had to the accompanying drawings, forming part of this specification, in which—

Figure 1:
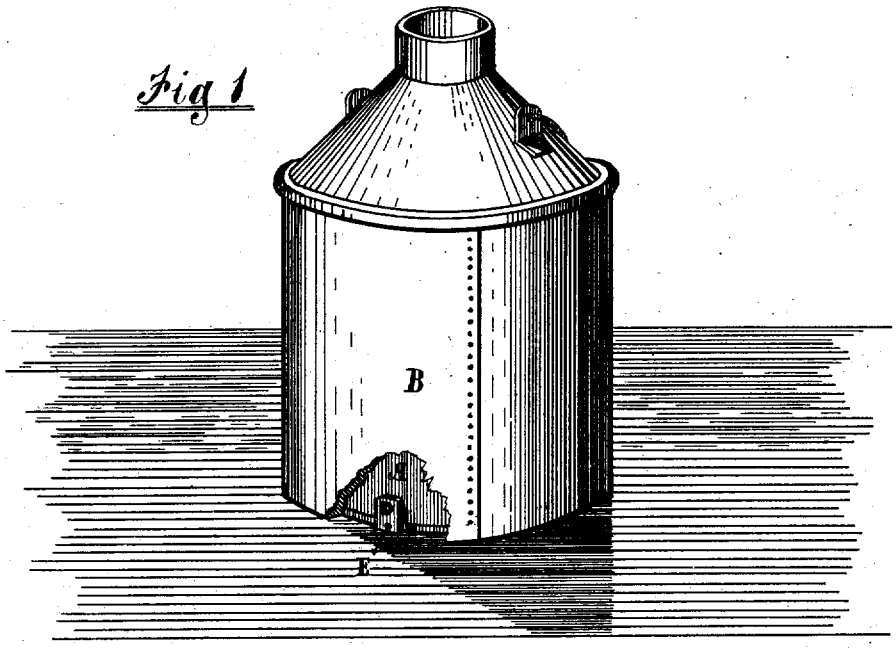
Figure 2:
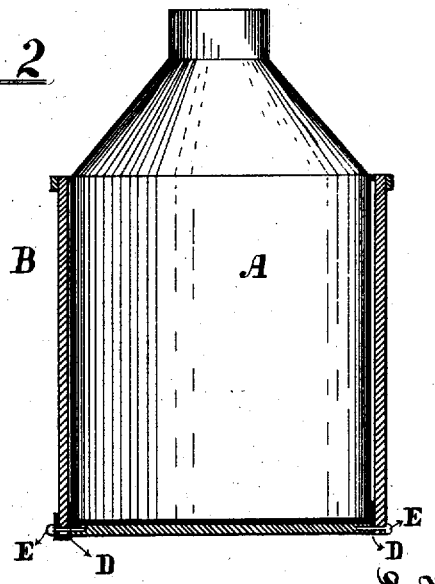

Figure 1 is a perspective view of a wood-incased can, the casing being partly broken away to show the method of securing it to the can, and Fig. 2 is a transverse section of the same.

Similar letters of reference denote corresponding parts in the several figures of the drawings.

The protecting case of a cylindrical shipping-can for liquids is usually composed of a wooden drum having a wooden bottom let into it. Within this case the can is inserted, and secured in place by being connected in any suitable manner to the upper end of the drum. Inasmuch as the drums shrink considerably after having been applied they are shortened to such an extent as to either split the drum or break the fastenings, and loosen the can.

My invention is intended to remedy this defect; and it consists in securing the can to the wooden casing or drum in such a manner that the casing may shrink on the can without loosening or injuring the fastening device.

In the accompanying drawings, A is a cylindrical sheet-metal liquid-can, and B is the wooden drum, having a wooden bottom let into it, as shown, and either provided with hoops or left plain, as preferred. D is a strip of tin or other sheet metal, secured to the exterior of the can, so as to extend below the bottom. This strip passes between the wooden drum and its bottom, and is either turned up upon the outside of the casing or hoop, as shown, or is cut off flush with the wooden bottom. The can is secured to the drum by nails or rivets E, driven through the drum and strip into the edge of the wooden bottom.

By this connection the drum is left free to move by shrinkage, without in the least affecting the fastenings. One strip is preferably employed for small cans, but two or more should be used upon cans of larger capacity. Instead of employing the strips D, the body of the can may be extended to form a rim or continuous flange between the wooden bottom and drum. Either the strips or continuous rim may be used; but it is preferable to employ the latter upon large cans, on account of its greater strength.

The drums used in the application of this invention are made of wood-veneers, which are applied so that the grain of the wood runs around the can.

Having thus described my invention, what I claim as new, and desire to secure by Letters Patent, is—

1. A metal can, in combination with an exterior wooden drum, secured to the can by devices which leave the drum free to move on the can by shrinkage, without loosening or injuring the fastenings, substantially as described.

2. The metal can A, in combination with a wooden drum, B, and metal strip D, secured to the exterior of the can, and fastened to the drum, substantially as and for the purpose set forth.

JOHN G. EVENDEN.

Witnesses:
L. A. BUNTING,
L. M. HARRIS.